(12) United States Patent
Kildevaeld

(10) Patent No.: US 8,516,708 B2
(45) Date of Patent: Aug. 27, 2013

(54) ROLLING RULER

(76) Inventor: Michael Rogler Kildevaeld, Yarmouthport, MA (US)

(*) Notice: Subject to any disclaimer, the term of this patent is extended or adjusted under 35 U.S.C. 154(b) by 217 days.

(21) Appl. No.: 13/015,536

(22) Filed: Jan. 27, 2011

(65) Prior Publication Data

US 2011/0179658 A1    Jul. 28, 2011

Related U.S. Application Data

(60) Provisional application No. 61/298,712, filed on Jan. 27, 2010.

(51) Int. Cl.
*G01B 3/12* (2006.01)
*G01C 9/00* (2006.01)

(52) U.S. Cl.
USPC .......... 33/449; 33/334; 33/451; 33/775; 33/780

(58) Field of Classification Search
USPC .......... 33/449, 333, 334, 348, 448, 451, 33/483, 772, 773, 774, 366.11
See application file for complete search history.

(56) References Cited

U.S. PATENT DOCUMENTS

| | | | | | |
|---|---|---|---|---|---|
| 1,482,930 | A | * | 2/1924 | Johnson | 33/449 |
| 1,631,731 | A | * | 6/1927 | Johnson | 33/483 |
| 1,825,902 | A | * | 10/1931 | Giuseppe | 33/449 |
| 2,183,086 | A | * | 12/1939 | Semon | 403/48 |
| 3,266,157 | A | * | 8/1966 | De Mathe | 33/449 |
| 3,835,543 | A | * | 9/1974 | Polydoris et al. | 33/781 |
| 4,242,804 | A | * | 1/1981 | Buerner | 33/438 |
| 5,193,284 | A | * | 3/1993 | Lin | 33/449 |
| 5,433,012 | A | * | 7/1995 | Liu | 33/449 |
| 6,195,902 | B1 | * | 3/2001 | Jan et al. | 33/286 |
| 6,199,292 | B1 | * | 3/2001 | Ebeling | 33/775 |
| 6,973,733 | B2 | * | 12/2005 | Levine | 33/484 |
| 7,802,372 | B1 | * | 9/2010 | Silberberg | 33/451 |

* cited by examiner

*Primary Examiner* — Christopher Fulton
(74) *Attorney, Agent, or Firm* — GTC Law Group LLP & Affiliates

(57) ABSTRACT

A rolling ruler comprises a blade member configured to facilitate taking a measurement. The blade member is coupled to a handle that is configured to be gripped by a user, wherein the handle acts as a housing for storing a plurality of electronic components, the plurality of electronic components providing predefined functionalities to the rolling ruler. Further at least one roller with a rolling surface that is partially exposed through a backside of the handle for contacting a surface to be measured is in operable contact with a portion of the plurality of electronic components to facilitate measuring distance based on rotations of the at least one roller.

17 Claims, 16 Drawing Sheets

ROLLING RULER

CROSS-REFERENCE TO RELATED APPLICATIONS

This application claims the benefit of the following provisional applications, each of which is hereby incorporated by reference in its entirety: U.S. Ser. No. 61/298,712 filed Jan. 27, 2010.

BACKGROUND

1. Field

The methods, systems, and apparatuses described herein relate to the field of hand tools.

2. Description of the Related Art

Hand tools are used by users with wide ranges of skills and abilities. Hand tools that improve usability may provide greater benefits to a wider range of users.

SUMMARY

The present invention provides a mechanical tool. The mechanical tool may include a handle, a shank member, a bit member, a cam driver, a motor, and a ratchet system. The handle may be extendable. The shank member may extend from a distal end of the handle. In an embodiment, the length of the shank member may be adjustable. Further, the bit member may be coupled to a distal end of the shank member. In an embodiment, the bit members may be interchangeable. In addition, the cam driver may be capable of rotating the shank member. Further, the motor may be coupled to the cam driver. The motor may provide power to the cam driver. The ratchet system may be configured to provide additional power to the mechanical tool. In an embodiment, the mechanical tool may include a switch that may be coupled to the ratchet system. The switch may be capable of shifting the directions of motion of the shank member.

In an aspect, the present invention provides a hand tool. The hand tool may include a head portion, a handle, and an opening. The handle may be extending from the head portion longitudinally. Further, the opening may be provided on at least a portion of the handle. The opening may extend from a distal end of the handle towards the head portion. The head portion may include a striking surface and a forked end. In an embodiment, the hand tool may be a one piece hand tool.

In another aspect of the present invention, a holder for holding a hand tool may be provided. The holder may include a magnet, a plate member covering the magnet, and a plurality of fastening means. Further, the plate member may be configured to hold a plurality of accessories. In an embodiment, the plurality of accessories may include at least one of a nail and a screw. In another embodiment, the plate member may be composed of a metal. The plurality of fastening means may be configured to attach the holder with a user's clothing. Further, the holder may be composed of a rigid plastic material.

In an embodiment, the present invention is a measuring device. The measuring device includes a pair of jaws, at least one light source, and an output device. The pair of jaws may be configured to hold an object to be measured. Further, the at least one light source may be coupled to the pair of jaws. The at least one light source may be capable of highlighting a contact area between the measuring device and an object. In an embodiment, the at least one light source may include at least one of a light emitting diode (LED), a halogen lamp, a fluorescent lamp, and the like. Further, the output device may be configured to transfer the measurement readings to an electronic device. In an embodiment, the output device may be a USB cable. Further, the electronic device may be a computer. Further, the measuring device may be a digital caliper.

In an aspect, the present invention provides a rolling ruler. The rolling ruler may include a blade member configured to facilitate measuring a length of an object; a handle coupled to the blade member and configured to be gripped by a user, wherein the handle acts as a housing for storing a plurality of electronic components, the plurality of electronic components providing predefined functionalities to the ruler; at least one roller with a rolling surface that is partially exposed through a backside of the handle for contacting a surface to be measured, the at least one roller in operable contact with a portion of the plurality of electronic components to facilitate measuring the object length based on rotations of the at least one roller. Furthermore, the blade member may include dimension markings thereon. The markings may define at least one of millimeters, centimeters, inches, and the like. In addition, the blade member may be composed of a steel material, plastic material, wood material, and the like.

Further, the handle may include a switch for activating a light source. The at least one roller is disposed longitudinally relative to the handle. The at least one roller may be rotatably supported by ball bearings. In an embodiment, the handle may have a rounded shape. The one of the plurality of electronic components may include a battery for providing power to at least one other of the plurality of electronic components. In an embodiment, one of the plurality of electronic components may include a light source for illuminating at least one of the rolling ruler and the object. The light source may be a light emitting diode, halogen lamp, fluorescent lamp, and the like.

In another embodiment, the one of the plurality of electronic components may include a level that may be configured to determine an orientation of the rolling ruler. Further, the level may be a digital level. The one of the plurality of electronic components may include a digital measuring system configured to provide digital measurement options. The digital measurement options may include alert settings. Further, the alert settings may be provided by a digital alert device. The digital measurement options may further include transmission of data. The transmission of data may be wireless or wired.

In yet another embodiment, the ruler may be adjustable longitudinally such that the longitudinal length may be adjusted by contracting or expanding the ruler. Further, the ruler may include a display panel. The ruler may also include an adjustable mount for holding markers such as a pen, a pencil, and the like.

BRIEF DESCRIPTION OF THE FIGURES

The invention and the following detailed description of certain embodiments thereof may be understood by reference to the following figures.

DETAILED DESCRIPTION

Cam and Leverage Screwdrivers

The present invention relates to mechanical hand tools such as screw drivers. A screwdriver is a tool for driving screws and rotating other machine elements with a mating drive system. The screwdriver may include a handle and a shank member that may be fixed to the handle. The tip of the shaft may be shaped to fit a particular type of screw. In an embodiment of the present invention, the screwdriver may be rotated manually, by an electric motor, and the like. The present invention provides a mechanical tool. The mechanical tool may include a handle, a shank member, a bit member, a cam driver, a motor, and a ratchet system. The handle may be extendable. The shank member may extend from a distal end of the handle. In an embodiment, the length of the shank member may be adjustable. Further, the bit member may be coupled to a distal end of the shank member. In an embodiment, the bit members may be interchangeable. In addition, the cam driver may be capable of rotating the shank member. Further, the motor may be coupled to the cam driver. The motor may provide power to the cam driver. The ratchet system may be configured to provide additional power to the mechanical tool. In an embodiment, the mechanical tool may include a switch that may be coupled to the ratchet system. The switch may be capable of shifting the directions of motion of the shank member.

Figure 1:
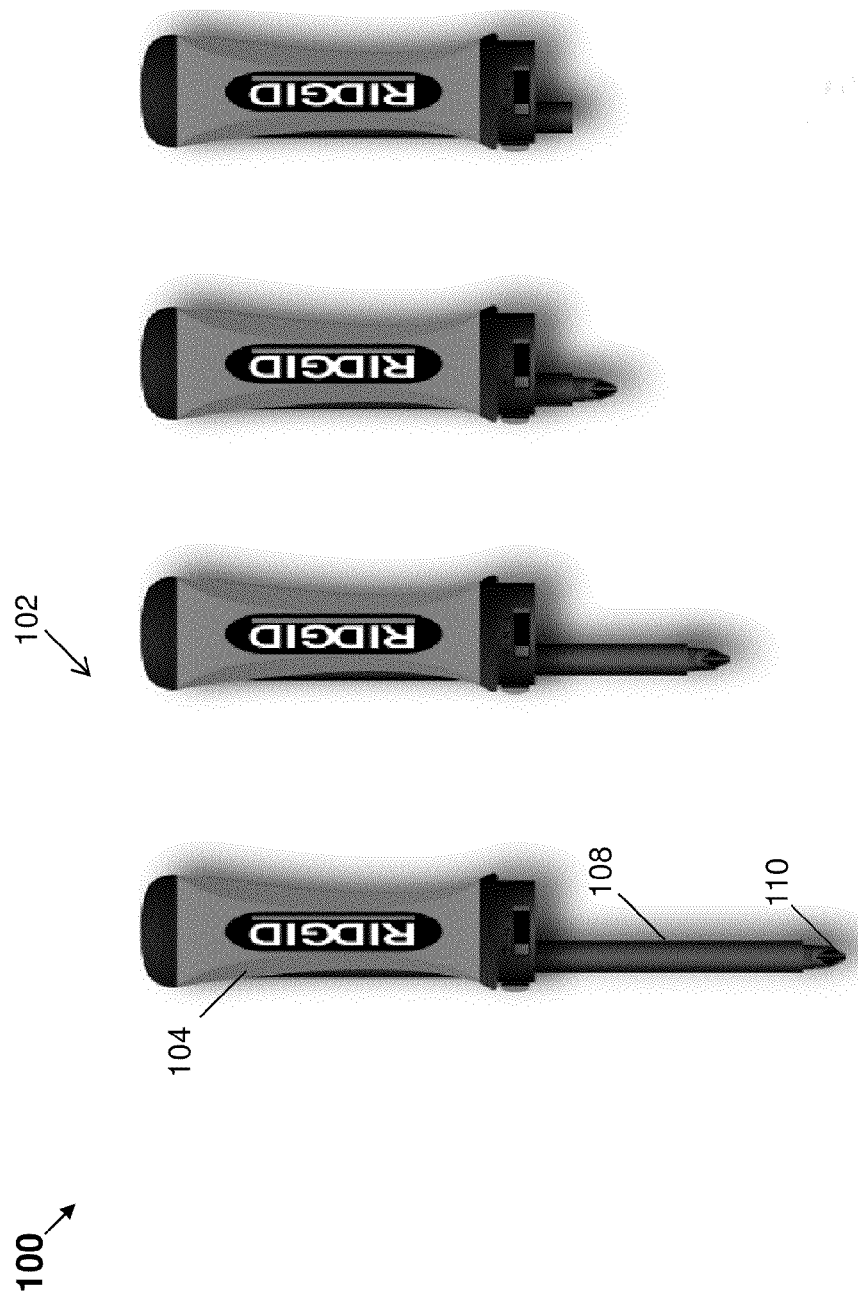
FIG. 1 depicts a perspective view various attachments of a screwdriver.

FIG. 1 depicts a perspective view 100 of the various attachments of a screwdriver 102. The screwdriver 102 may include a handle 104, a shank member 108, and a bit member 110 connected to the shank member 108. The bit member 110 may be shaped to fit a particular type of a screw. In an embodiment, the screwdriver 102 may include interchangeable bit members 110 based on the types of screws. Further, the shank member 108 of the screwdriver 102 may be removable. As shown in FIG. 1, the shank member 108 may be adjusted to various lengths as per the requirement of a user. Further, the screwdriver 102 may include a cam driver (not shown) to apply torque by rotating the bit member 110. In use, the cam driver may rotate the shank member 108 with the help of a motor (not shown). The cam driver is a mechanical linkage that may be used to transform and/or transmit motion from the motor to the rotating shank member 108. The motor may be powered by means of batteries, AC mains, and the like. Further, the shank member 108, upon being rotated by the cam driver, may rotate the bit member 110. In an embodiment, the cam driver may include ball bearings.

In an embodiment of the present invention, the screwdriver 102 may include a variable torque range and a torque limiting clutch. The clutch may disengage the screwdriver 102 once the preset torque has been reached, thereby preventing over-tightening of the screws. Further, the screwdriver 102 may include a ratchet system built into the cam driver. The ratchet system may lock the bit member 110 to the handle 104 for clockwise rotation. The ratchet system may uncouple the bit member 110 for counterclockwise rotation when set for tightening screws and vice versa for loosening. In powered screwdrivers, the user may push the handle 104 toward a workpiece, causing a pawl in a spiral groove to rotate the shank member 108 and the bit member 110.

In an embodiment, the screwdriver 102 may include a switch that may reverse the direction of the ratcheting system to shift between clockwise and counterclockwise motions. Further, the screwdriver 102 may include an extension handle.

Figure 2:
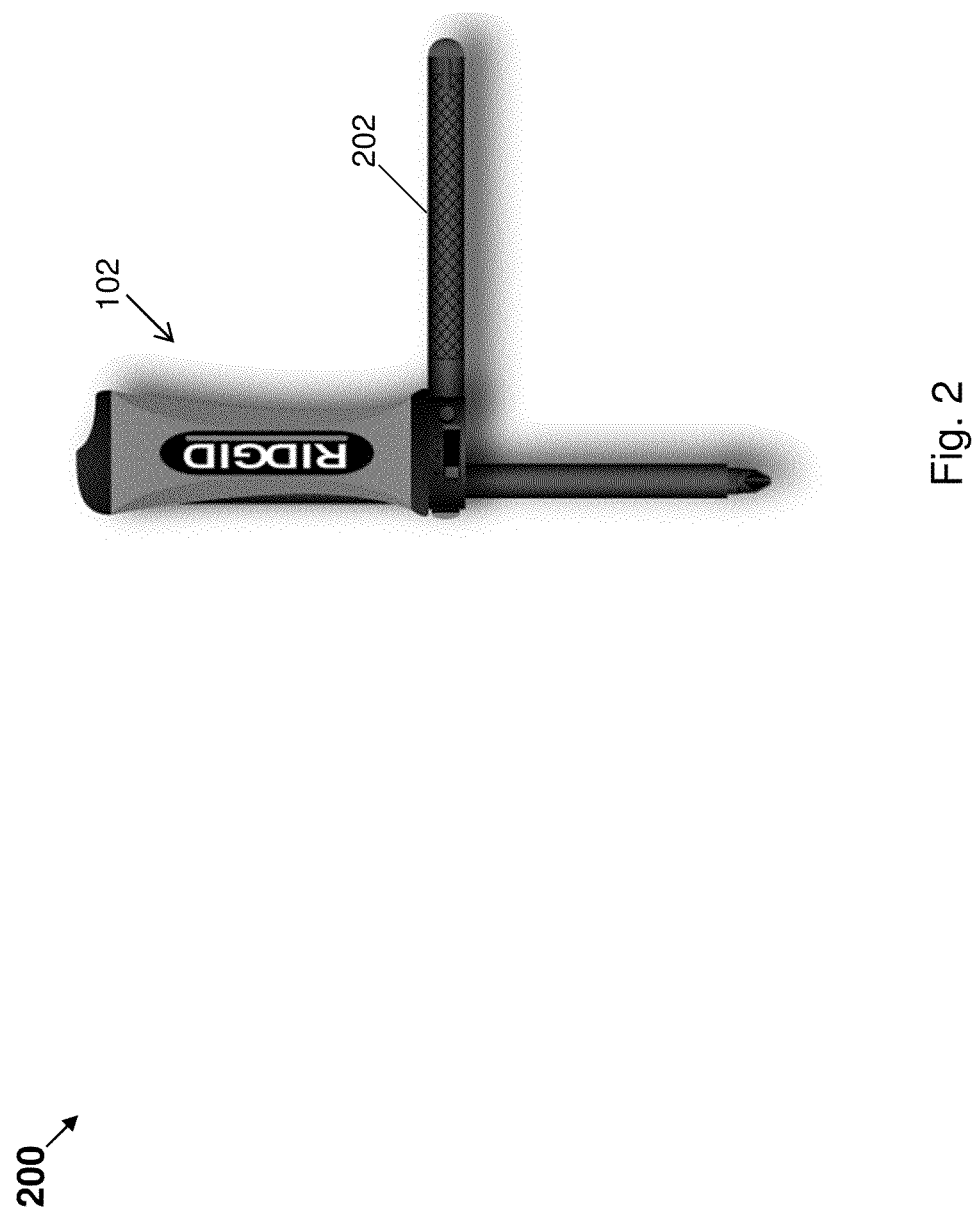
FIG. 2 depicts a perspective view of the screwdriver with an extension handle.

Referring to FIG. 2, a perspective view 200 of the screwdriver 102 is depicted with an extension handle 202. The extension handle 202 may be of the shape of a crowbar. In an embodiment of the present invention, the screwdriver 102 may be an offset screwdriver.

Figure 3:
FIG. 3 depicts a perspective view of an offset screwdriver.

Referring to FIG. 3, a perspective view 300 of an offset screwdriver 302 is depicted. The offset screwdriver 302 may include components similar to the components of the screwdriver 102. The offset screwdriver 302 may be used at a perpendicular angle as compared to the screwdriver 102. In other words, an end portion of the shaft member 108 of the offset screwdriver 302 has a ninety degree turn. Instead of twisting the handle 104, the offset screwdriver 302 may be rotated both clockwise and counter-clockwise. The offset screwdriver 302 may use a leverage type torque by offsetting the shaft member 108. Further, the offset screwdriver 302 may offer increased leverage, making it easier to turn and remove screws.

In an embodiment, the shaft member 108 of the offset screwdriver 302 may be removable and may also be adjusted to different lengths. Further, the offset screwdriver 302 may be found with a fixed handle but may include interchangeable shaft members 108 and the bit member 110. In an instance, the bit members 110 of the offset screwdrivers 302 may be magnetized. The magnetized bit members 110 may be easily matched with the screws. The shaft member 108 may be collapsible for easily carrying the offset screwdriver 302. The offset screwdriver 302 may also include an extendable arm as shown in FIG. 4.

Figure 4:
FIG. 4 depicts a perspective view of an extendable arm of the offset screwdriver.

Referring to FIG. 4, a perspective view 400 of an extendable arm 402 of the offset screwdriver 302 is depicted. The extendable arm 402 may be coupled to the handle 104.

Anti-Vibration Hammer

The invention relates to a hand tool that may dampen the vibrations caused while using the hand tool. The present invention provides a hand tool. The hand tool may include a head portion, a handle, and an opening. The handle may be extending from the head portion longitudinally. Further, the opening may be provided on at least a portion of the handle. The opening may extend from a distal end of the handle towards the head portion. The head portion may include a striking surface and a forked end. In an embodiment, the hand tool may be a one piece hand tool.

Figure 5:
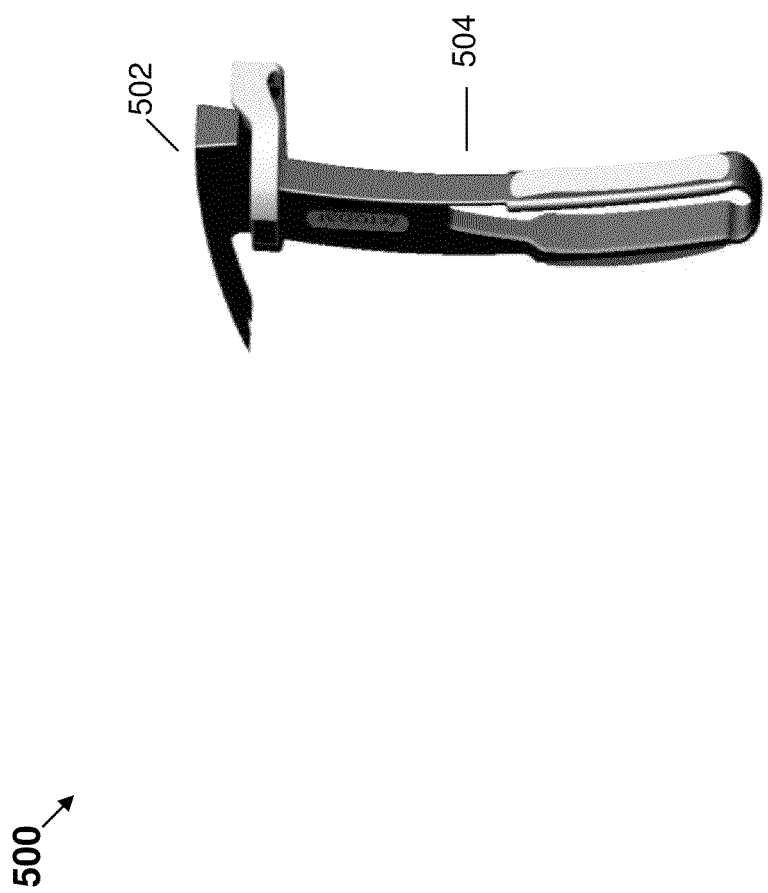
FIG. 5 depicts various perspective views of a hand tool.

Referring to FIG. 5, a perspective view of the hand tool 500 is depicted. The hand tool 500 may be a hammer that may include a head portion 502 and a handle portion 504. In an embodiment, the head portion 502 may be made up of different materials such as brass, copper, and the like. Likewise, the handle portion 504 may be composed of different materials such as wood, steel, and the like. In an embodiment, the hand tool 500 may be a one-piece hand tool made up of steel material.

Figure 6:
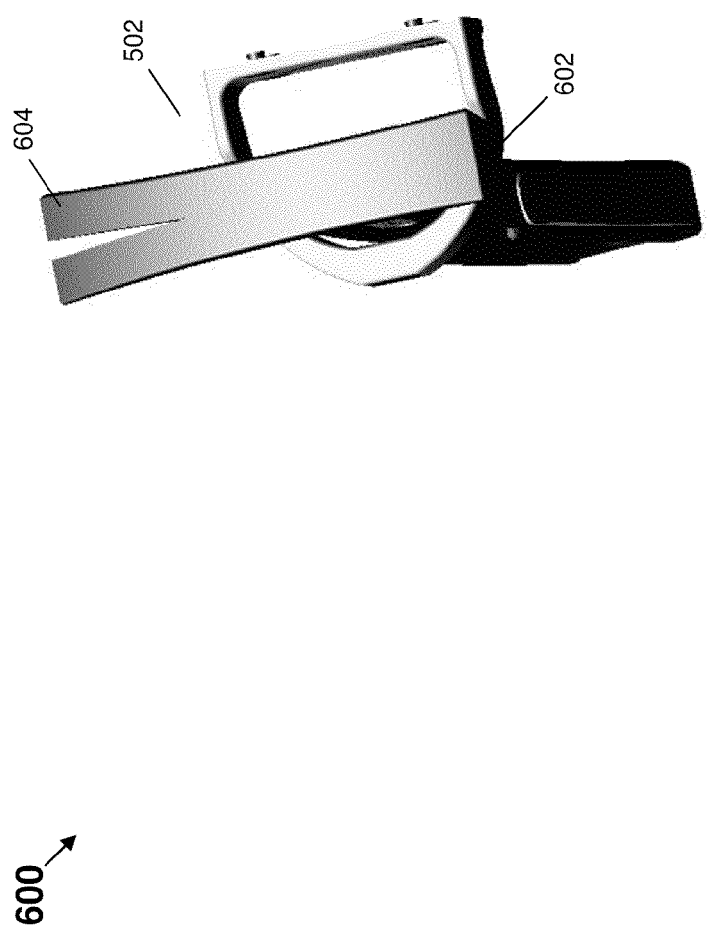
FIG. 6 depicts a top view of the hand tool.

Now referring to FIG. 6, a top view 600 of the hand tool 500 is depicted. The head portion 502 may include a striking surface 602 and a tapered forked end 604 for removing nails. The striking surface 602 may be adapted to strike an object such as a nail when the hand tool 500 is swung. The tapered forked end 604 may serve as a claw to grip and pull the nails up by levering the head portion 502. The handle portion 504 of the hand tool 500 may be explained in conjunction with FIG. 7.

Figure 7:
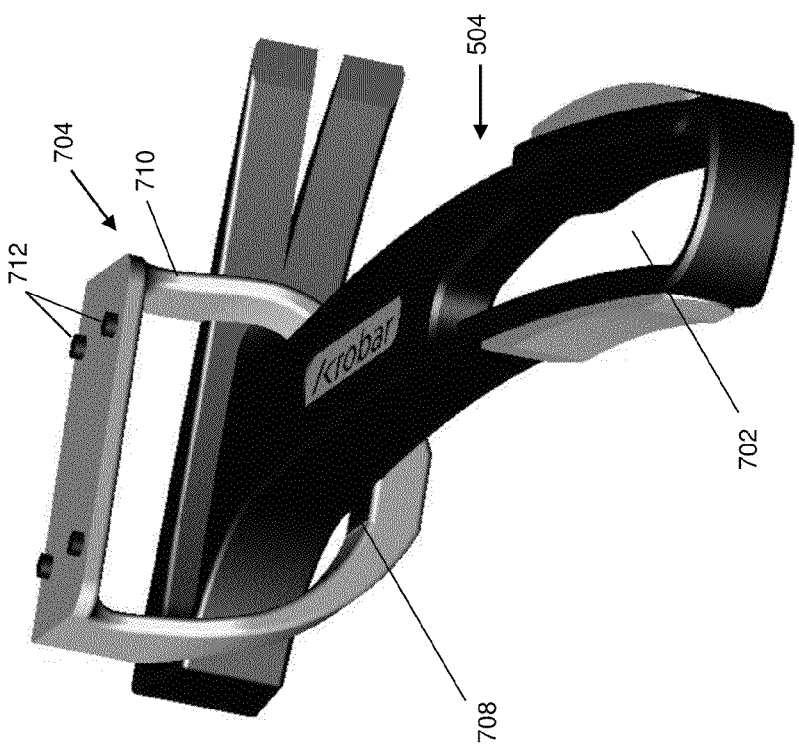
FIG. 7 depicts a bottom view of the hand tool along with a holder.

Referring to FIG. 7, a bottom view 700 of the hand tool 500 is depicted. The handle portion 504 may include an opening 702. The opening 702 may make the hand tool 500 lightweight. However, the head portion 502 of the hand tool 500 may remain heavy to facilitate striking objects. In addition, the opening 702 may reduce the stiffness of the handle portion 504 and mitigates vibration transmission by acting as a tuning fork. In an example, when the hand tool 500 strikes an object such as a nail, the opening 702 in the handle portion 504 may intercept the vibrations. The vibrations may travel through the handle portion 504 and thus enables a user to avoid working injury.

In another embodiment of the present invention, the hand tool 500 may be provided with a holder. In another aspect of the present invention, a holder for holding a hand tool may be provided. The holder may include a magnet, a plate member covering the magnet, and a plurality of fastening means. Further, the plate member may be configured to hold a plurality of accessories. In an embodiment, the plurality of accessories may include at least one of a nail and a screw. In another embodiment, the plate member may be composed of a metal. The plurality of fastening means may be configured to attach the holder with a user's clothing. Further, the holder may be composed of a rigid plastic material.

Again referring to FIG. 7, a holder 704 to hold the hand tool 500 in place is depicted. The holder 704 may be made up of a rigid plastic material. It will be evident to a person skilled in the art that the holder 704 may also be composed of a leather material, and the like. Further, the material of the holder 704 may be strong enough so that the holder 704 may not break in hot and cold weather conditions.

In an embodiment, the holder 704 may include a magnet 708 that may facilitate holding hand tool 500 that may be made up of a steel material. In an embodiment, the magnet 708 may be made up of a rare earth or other type of material. In an example, when a person gets on a roof, the magnet 708 nay not let the hand tool 500 slip away from the holder 704. In addition, the plastic material of the holder 704 may not create noise that the hand tools make with metal loops.

Further, the holder 704 may include a metal plate 710 for holding nails, screws, and the like. The metal plate 710 may provide quick and easy access to the nails, screws, and the like. The holder 704 may be attached to a tool belt or clothing of the user. In an embodiment, the holder 704 may include fasteners such as rivets 712 that may be attached to the tool belt. The rivets 712 may allow the holder 704 to be ridged onto a mounted surface such as a leather bag, a belt, and the like.

Backlit Caliper Tools

Figure 8:
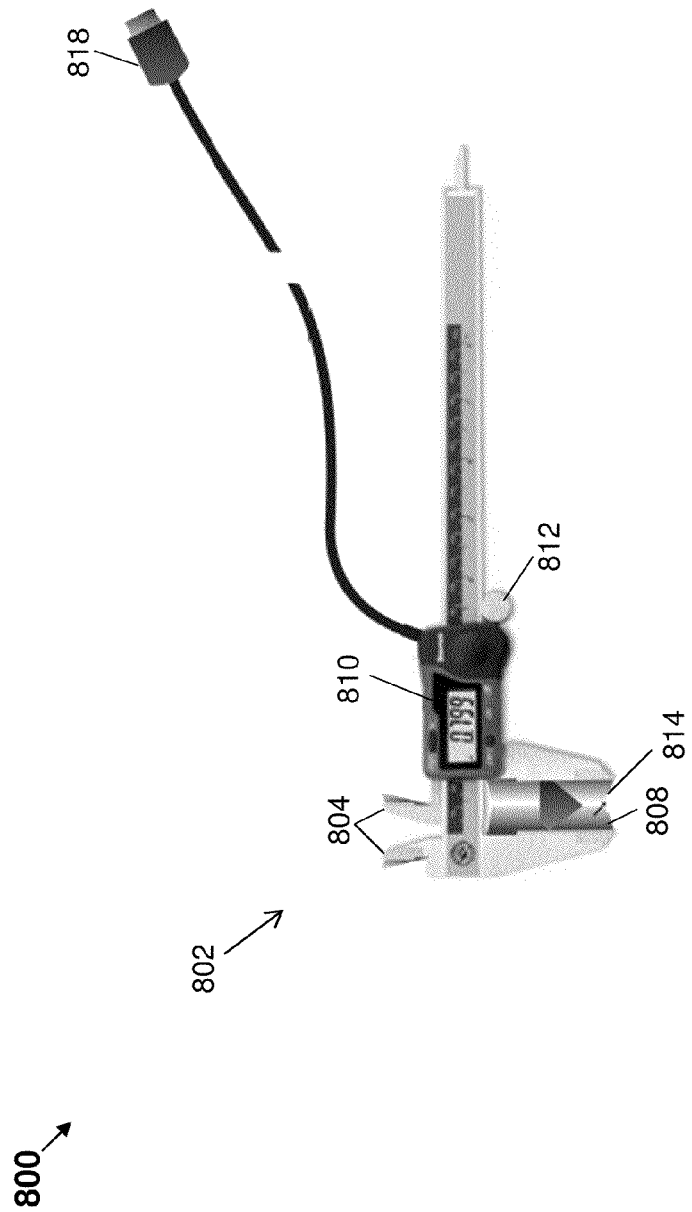
FIG. 8 depicts a perspective view of a measuring device.

The present invention provides a measuring device with a light source. Referring to FIG. 8, a perspective view 800 of a measuring device such as a caliper 802 is depicted. In the present embodiment, the caliper 802 may be a digital caliper. The caliper 802 may include a pair of internal jaws 804, a pair of external jaws 808, a display window 810, a locking screw 812, a light source 814 and an output device 818.

Further, the light source 814 may be coupled with the pair of internal jaws 804 and the pair of external jaws 808. The light source 814 may highlight a contact area between an object 820 and the jaws of the caliper 802. The light source 814 may include a Light Emitting Diode (LED), and the like.

The output device 818 may facilitate a user to download the measurement data taken by the caliper 802 to an electronic device such as a personal computer. In other words, the output device 818 may enable the caliper 802 to be interfaced with the personal computer. The measurement data may be transmitted to the computer by means of Bluetooth, Universal Serial Bus (USB), and the like. The digital interface may improve the reliability of the measurement data. Further, the output device 818 may enable a user to directly enter the measurements into a spreadsheet, a statistical process control program, and the like.

In an embodiment, the measurement data may be streamlined from the caliper 802 into drawing software of the personal computer. Examples of the drawing software may include, but are not limited to, AutoCAD, CorelDraw, and the like. The users may use such drawing software to prepare drawings directly from the measurement data. The users may need to take a license of the software before being able to use it.

Rolling Ruler

Figure 9:
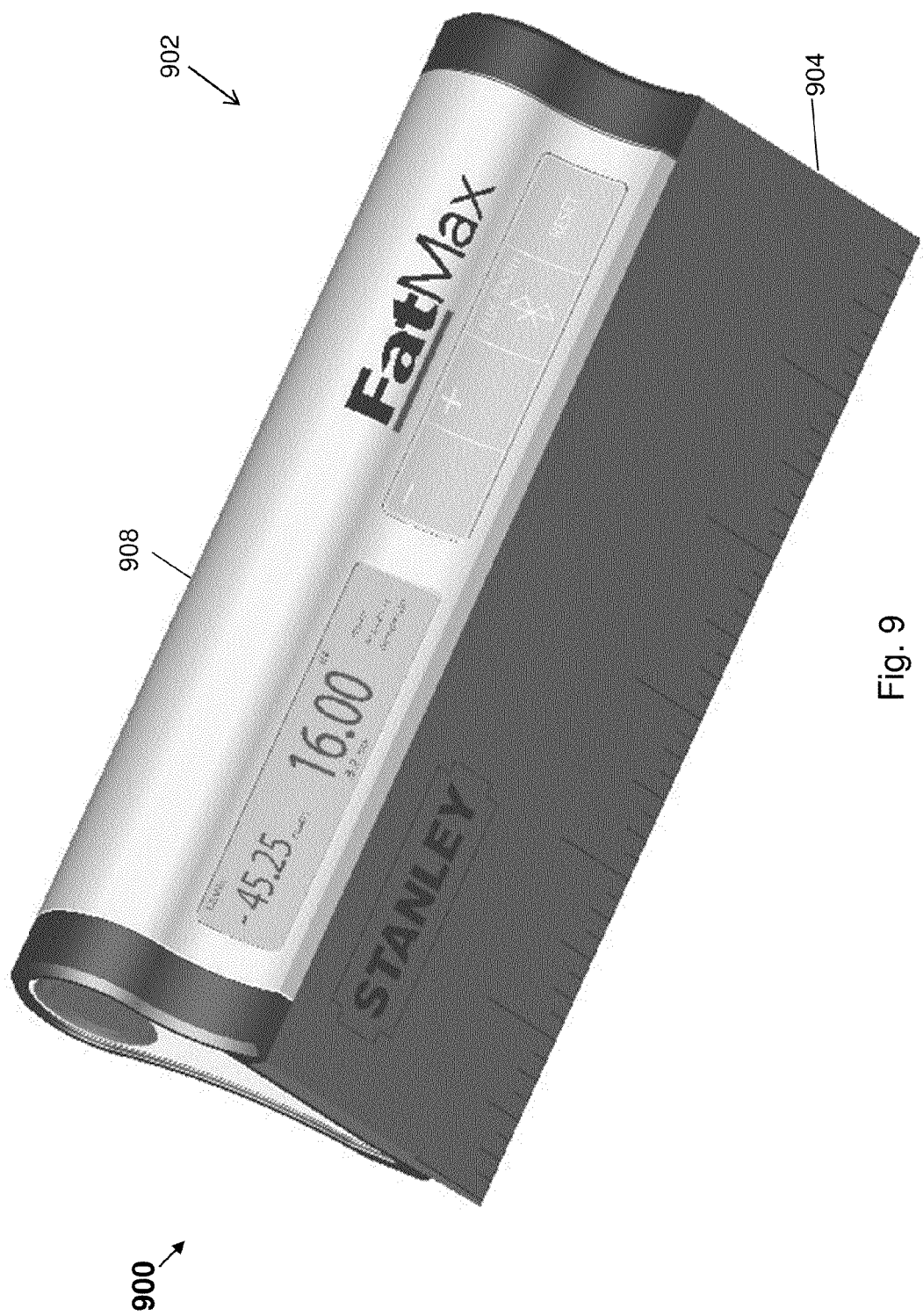
FIG. 9 depicts a front perspective view of a rolling ruler.

The present invention provides a ruler, and more specifically, a rolling ruler for drawing sets of horizontal and vertical parallel lines. Referring to FIG. 9, a front view 900 of a rolling ruler 902 is depicted. The rolling ruler 902 may include a blade member 904 and a handle 908. The blade member 904 may be configured with markings such as ruler measurements. The ruler measurements may be provided in different units. The units of measurements may include but are not limited to millimeters, centimeters, and inches. Further, the blade member 904 may be composed of a steel material. It will be evident to a person skilled in the art that the blade member 904 may also be made up of materials other than steel such as plastic, wood, and the like.

Figure 10:
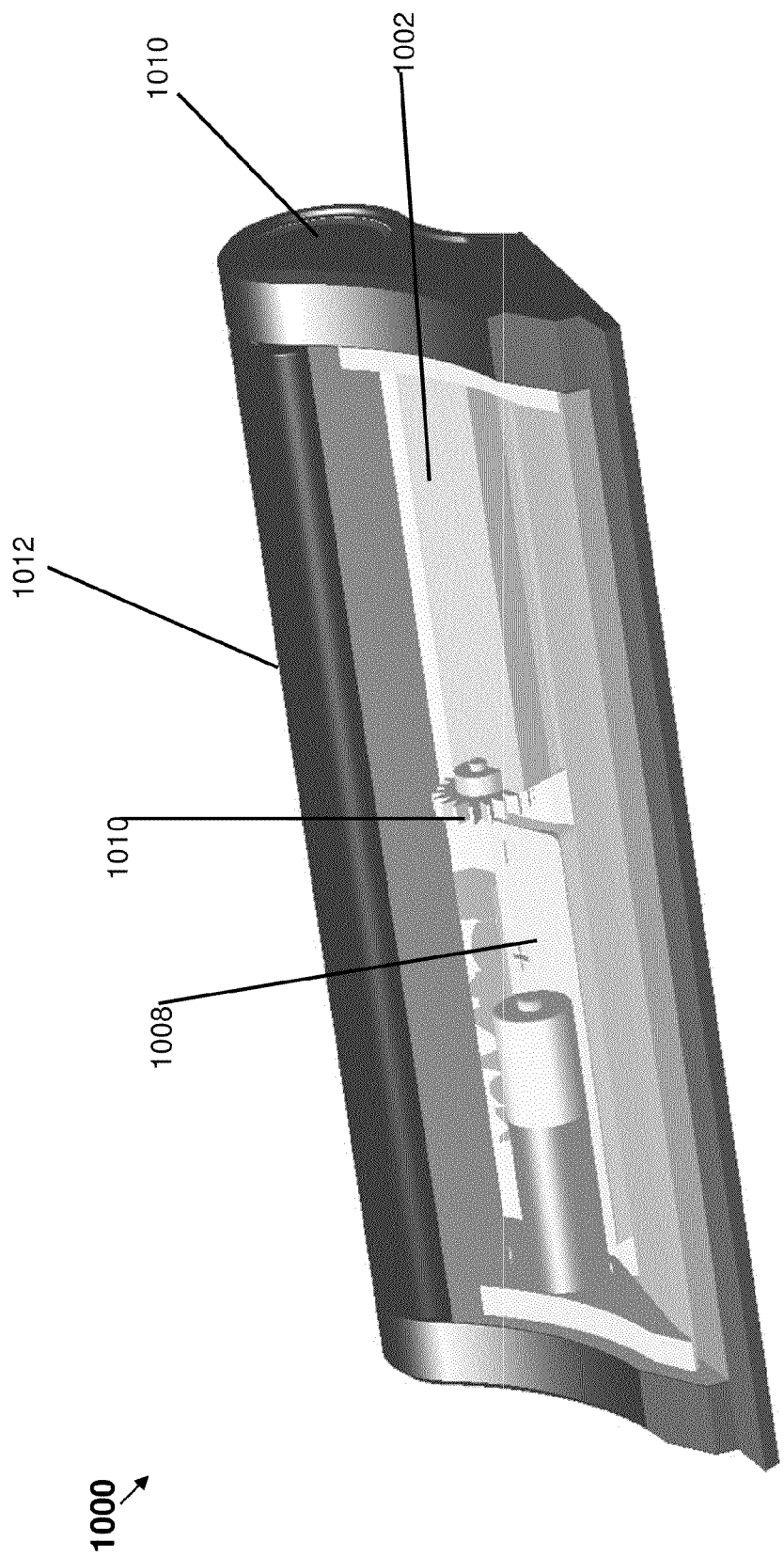
FIG. 10 depicts a perspective view of the rolling ruler.

Further, referring to FIG. 10, a perspective view 1000 of the rolling ruler 902 is depicted. In an embodiment, the handle 908 may be extruded to form an enclosure 1002 that may be disposed on a lateral edge of the rolling ruler 902. The enclosure 1002 may provide interiors for configuring electronic devices, roller mounts and sensors, and the like inside the enclosure. For example, the enclosure 1002 may act as a housing for storing batteries inside. In another embodiment, the handle 908 may be an ergonomic handle that may be attached to the rolling ruler 902. The ergonomic handle may enable a user to firmly grip the handle 908. In an example, the handle 908 may include a slot for placing a thumb and gripping the rolling ruler 902 with the fingers. In another example, the handle 908 may include a soft grip material such as an encapsulated gel material. Further, the handle 908 may be adjustable through a longitudinal axis of the rolling ruler 902.

In the above example, the handle 908 includes storage for electronics, such as batteries. The batteries may be connected to a light source (not shown) such as light emitting diode (LED), halogen lamps, and the like. The light source may enable a user to view a work areas for using the rolling ruler 902 in poor light conditions.

In embodiments, the light source may be disposed between the blade member 904 and the handle 908 of the rolling ruler 902. Specifically, the light source may be disposed to provide illumination from the rear of the blade member 904 of the rolling ruler 902. Such an arrangement of the light source may highlight the working area of the rolling ruler 902. This may enable the user to view the work area to record the measurements clearly in low lighting conditions.

In an embodiment, the handle 908 may include a power switch 1010. The switch 1010 may be a toggle or push button for activating the rolling ruler 902. The switch 1010 may be disposed at an end portion of the handle 908. It will be evident to a person skilled in the art that the switch 1010 may be configured at any location other than the end portion of the handle 908 as per requirement and convenience.

A microcontroller 1008 may provide various controls to the rolling ruler 902. For example, the microcontroller 1008 may facilitate communication between the rolling ruler 902 and an electronic device such as a computer, mobile phone, and the like. Further, the microcontroller 1008 may allow the user to store various measurements in the rolling ruler 902. In an embodiment, a roller 1012 disposed within the handle 908 of the rolling ruler 902 may turn on an encoder 1010 that may be detected by the microcontroller 1008. The encoder may convert the movement of the roller 1012 to a digital value that may be read by the microcontroller 1008.

In an embodiment, the rolling ruler 902 may also be manufactured in various sizes and shapes, potentially depending on the intended use or target industry. In an example, the rolling ruler 902 may be small in size that may be used in applications that are similar to using a measuring tape. In another example, the rolling ruler 902 may be longitudinally long to facilitate measuring a wide surface. In another example, the length of the rolling ruler 902 may be adjustable. Such a rolling ruler 902 may be expanded or contracted in length as per the requirement.

Figure 11:
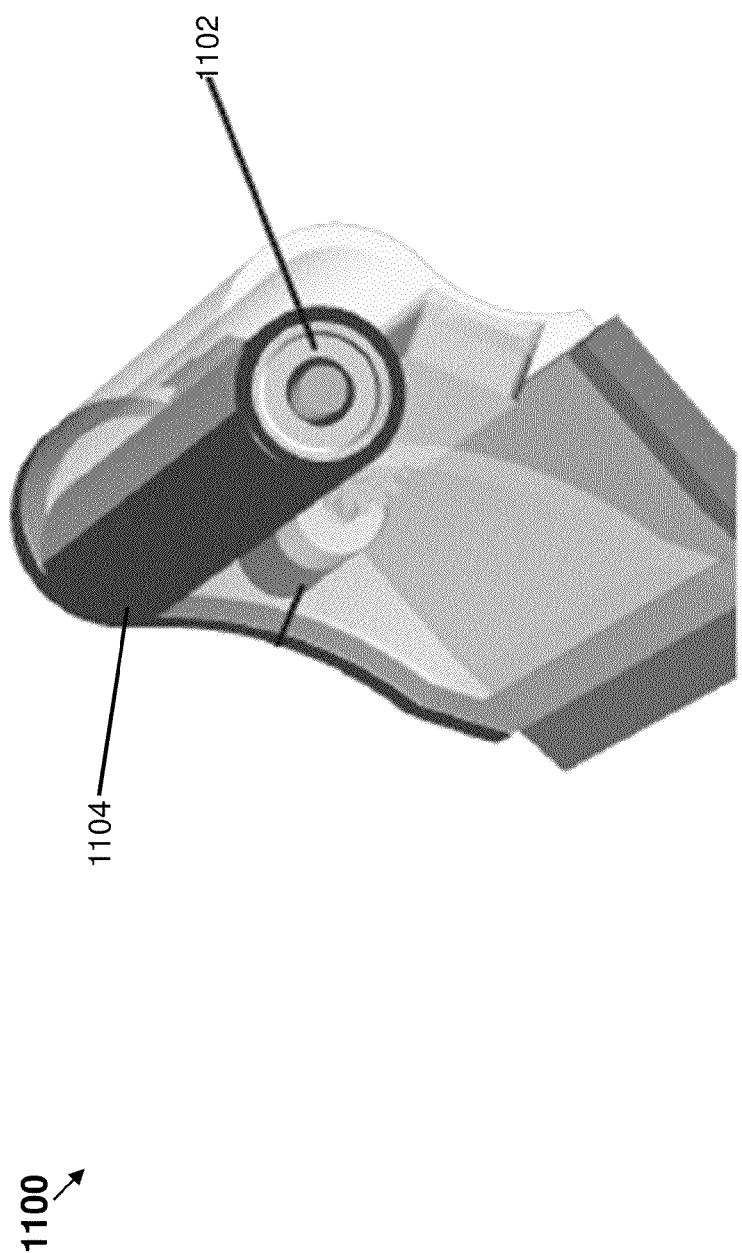
FIG. 11 depicts a cross-sectional view of the handle of the rolling ruler.

Now, referring to FIG. 11, a cross-sectional view 1100 of the rolling ruler 902 is depicted. The handle 908 may include ball bearings 1102 for reducing rotational friction of the roller 1104. In an embodiment, the roller 1104 may be fixed to the rolling ruler 902 and may rotate around a single axis. Thereby, the roller maintains the same speed of the user induced movement rolling ruler 902 to provide a straight line measurement. In an example, the rolling ruler 902 may include a single roller 1104 or a plurality of in-line rollers. The roller 1104 may be configured with the handle 908 of the rolling ruler 902 thereby providing a roller shape to the rolling ruler 902. In yet another example, the rolling ruler 902 may include three or more in-line rollers that may be placed between the two ends of the handle 908. The ball bearings 1102 may be provided at either or both ends of the roller(s) 1104. Further, the roller may facilitate the user to drag the blade member 904 of the rolling ruler 902 with convenience. In an embodiment, the roller may be include plastic material that may have a rolling surface. Further, the wheels may include metal portions, a non-slip rolling surface, and the like.

Figure 12:
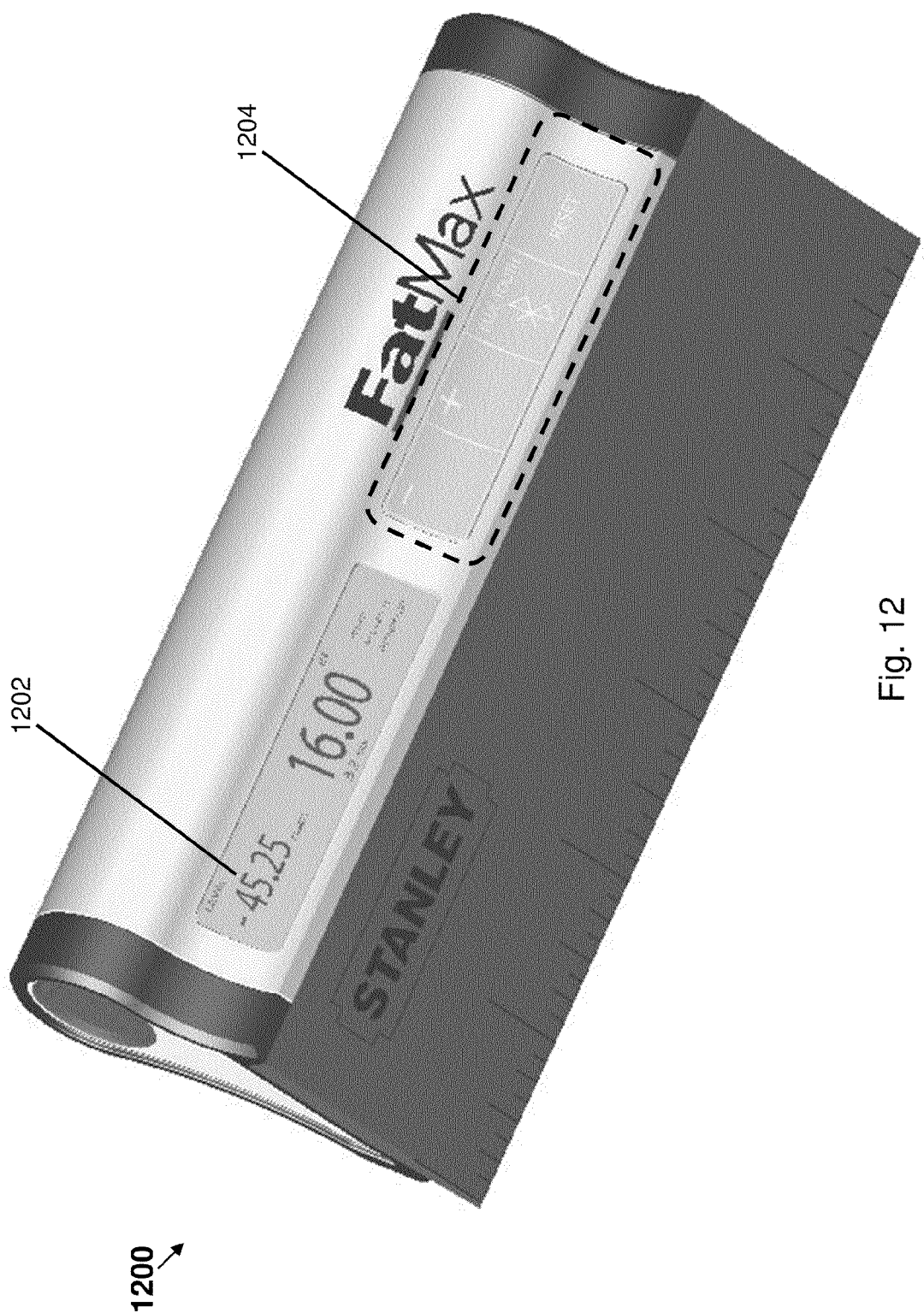
FIG. 12 depicts a front view of the rolling ruler with a digital level.

In an embodiment, the rolling ruler 902 may include a digital level. Referring to FIG. 12, a front view 1200 of the rolling ruler 902 with a digital level 1202 is depicted. The digital level 1202 may accurately indicate whether the rolling ruler 902 is being held in a horizontal, vertical, or other angle. Further, the digital level 1202 may be used for placing the rolling ruler 902 at a specific angle. For example, the user may place the rolling ruler 902 and orient it so the display reads 45 degrees. Further, the digital level 1202 may be controlled by one or more push buttons 1204 that may be used to adjust the digital level settings in the rolling ruler 902. For example, the user may save a measurement taken at a particular angle in the rolling ruler 902 by pressing one of the buttons 1204. While taking another measurement, the user may reset the memory of the rolling ruler 902 by pushing a button.

Figure 13:
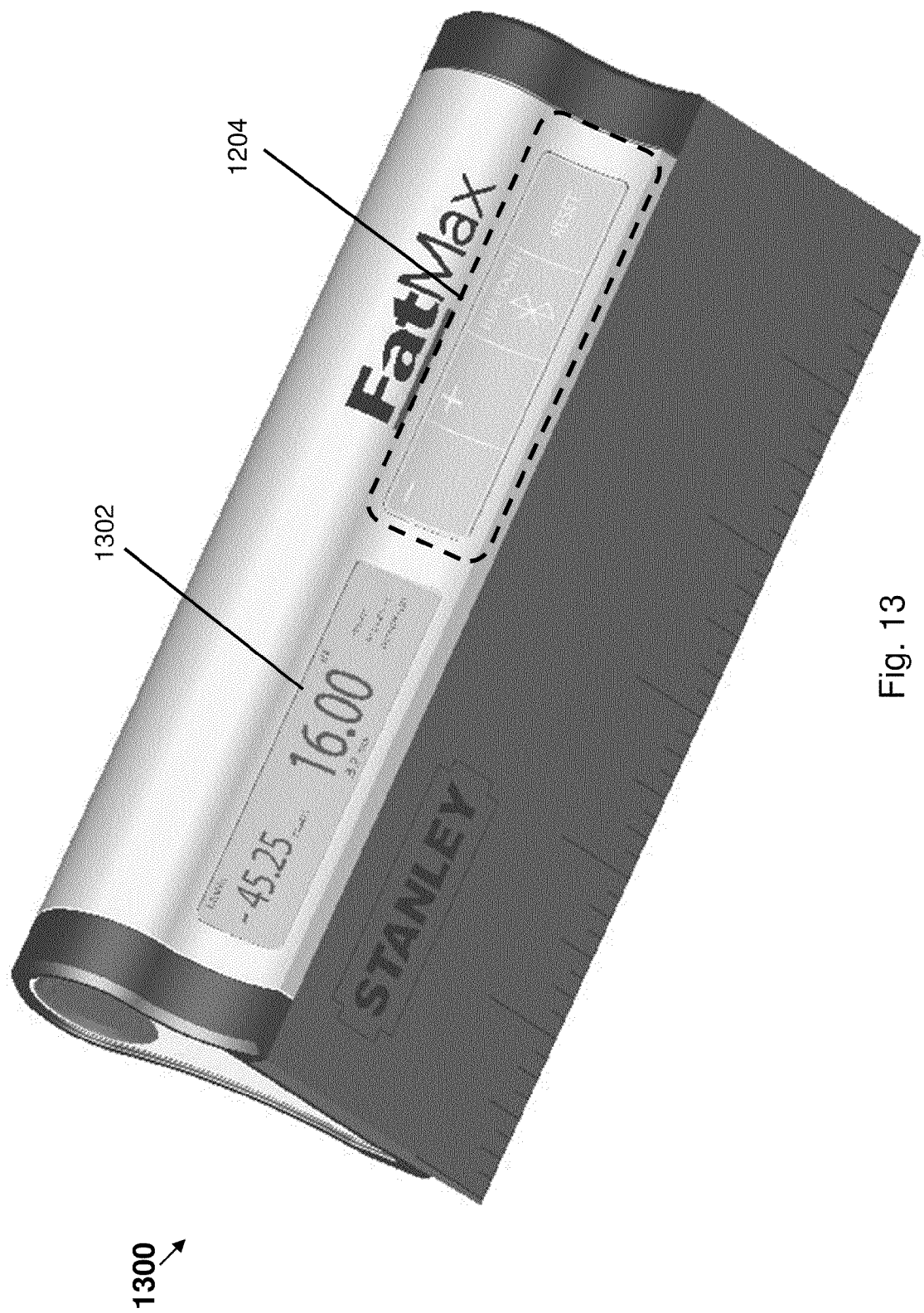
FIG. 13 depicts a perspective view of the rolling ruler with a digital measuring system.

In an embodiment, the rolling ruler 902 may include a digital measuring system. Referring to FIG. 13, a perspective view 1300 of the rolling ruler 902 with a digital measurement and display system 1302 is depicted. The digital measurement and display system 1302 may be controlled by the microcontroller 1008. In another embodiment, the digital measurement and display system 1302 may determine a distance travelled by the roller and may display the distance to the user.

Further, the digital measurement and display system 1302 may be controlled by various feature keys 1204 to the rolling ruler 902. As mentioned herein, the handle 908 may include keys 1204 that may enable the user to set various functions as per the requirement. The keys 1204 may allow the user to choose a language, a unit of measurement, and the like. For example, the user may switch the measuring units from inches to millimeters; the user may reset any reading to zero, and the like. In another example, the digital measurement and display system 1302 may include customized screens for each measuring unit. In embodiments, the handle 908 may include keys 1204 for setting various functions. The functions may include but are not limited to inches/millimeters/fractions, start, stop, reset, interval measurement, capture and save, capture and transmit captured measurement, and alerts. The functions mentioned above will be explained in detail in later paragraphs. The user may select INCHES as the measuring unit by using the keys 1204. The digital measurement and display system 1302 may display a customized screen for taking measurements in INCHES. In yet another example, the keys 1204 may include '+' and '−' keys for scrolling through different screen types.

In embodiments, the keys 1204 may facilitate the rolling ruler 902 too be used in a stop watch measuring mode. For example, to measure the distance from one end of a wall to the center of the wall, the user may press a start key at one end and may drag the rolling ruler 902 to the center of the wall. After reaching the center of the wall, the user may press a stop key that captures the measurement when the key is pressed and zeros the display. The user may continue rolling the rolling ruler 902 to a second point and press a stop key to finish measuring and to capture that measurement. The user may press a display or other key to toggle between the first captured measurement and the last captured measurement. The user may press a key that may display the total distance measured. These and other stop-watch type features may be included. Further, the measurements recorded by the rolling ruler 902 may be stored in the memory of the rolling ruler 902 for future use. The digital measurement and display system 1302 may record and store multiple measurements in the memory of the rolling ruler 902, such as a memory in the microcontroller 1008.

In an embodiment, the digital measurement and display system 1302 may facilitate transmission of measurements recorded in the rolling ruler 902 to the electronic device such as a computer, mobile phone, and the like. Again referring to FIG. 13, the rolling ruler 902 may include a button 1204 for facilitating data transmission between the rolling ruler 902 and the electronic device. In an embodiment, the data transmission may take place through wireless communication. For example, button may enable data transmission through Bluetooth by activating the Bluetooth of the rolling ruler 902. In another embodiment, the rolling ruler 902 may include proximity sensors for detecting nearby electronic devices. A button 1204 may activate the proximity sensors and may enable the user to interact with the electronic devices. In another embodiment, the data transmission may take place through wired communication. For example, the user may directly plug in the electronic device to the rolling ruler 902.

In embodiments, the digital measurement and display system 1302 may include a measurement detection feature that may allow the user to set an alert to be generated at a preset distance. Further, the alert may be an audio indication such as a beep, a visual indication such as blinking the display or the light, a combination of both audio and visual indications, and the like. For example, the user may set an alert each time the ruler travels 16 inches along a surface. The alert function of the rolling ruler 902 may beep after every 16 inches travelled by the wheels of the rolling ruler 902. Alerts may be associated with the digital level. In another example, the user may set an alert signal when the rolling ruler 902 is in a vertical orientation, such as might be desirable when positioning a framed wall section.

Figure 14:
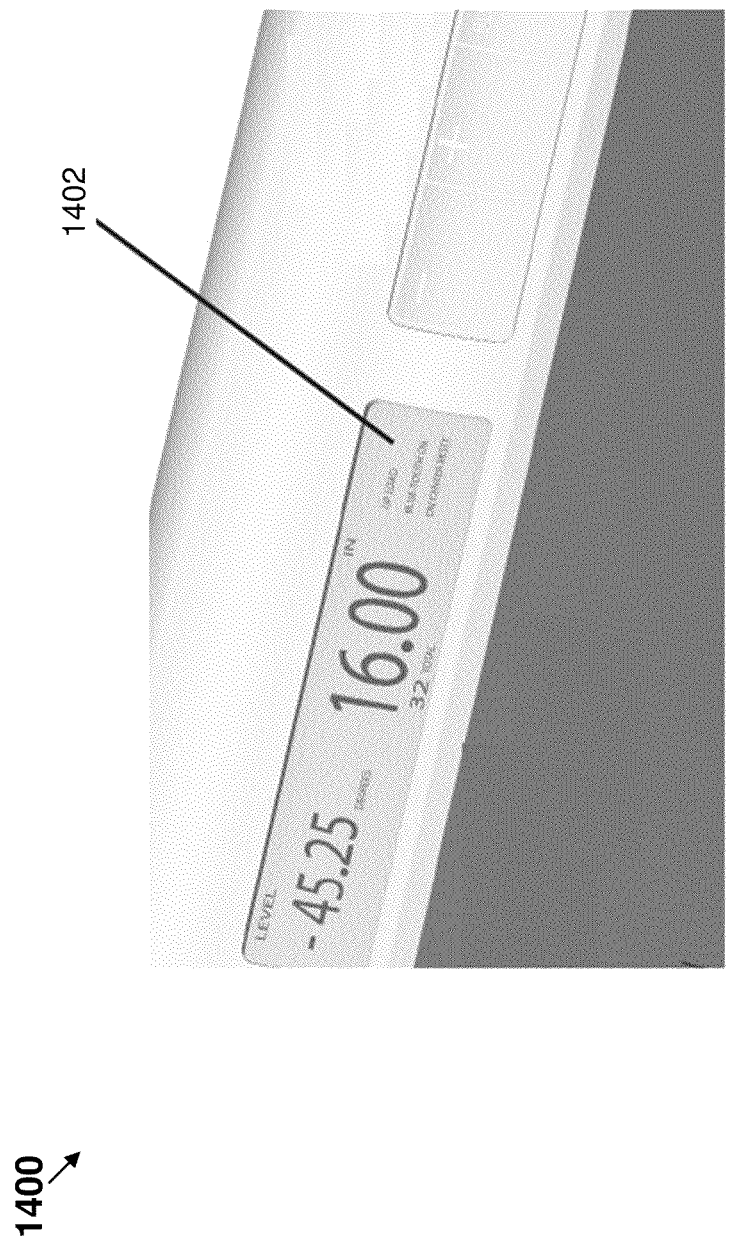
FIG. 14 depicts a perspective view of a display screen of the ruler.

Referring to FIG. 14, a perspective view 1400 of a display panel 1402 of the rolling ruler 902 is depicted. The display panel 1402 may display information about the measurements recorded by the rolling ruler 902. The display panel 1402 may be a liquid crystal display (LCD), a light emitting diode (LED) display, and the like. The LCD may include a backlight. In an embodiment, the display may be programmable. For example, the display may be programmed for blinking while displaying a new measurement. Further, the display may be programmed to blink when the rolling ruler 902 is switched on or off. In embodiments, the display panel 1402 may be in co-ordination with the roller, such as through the microcontroller 1008. For example, the display panel 1402 and the roller may be coordinated by the microcontroller 1008, such that the movement of the roller will be displayed on the display panel 1402.

Figure 15:
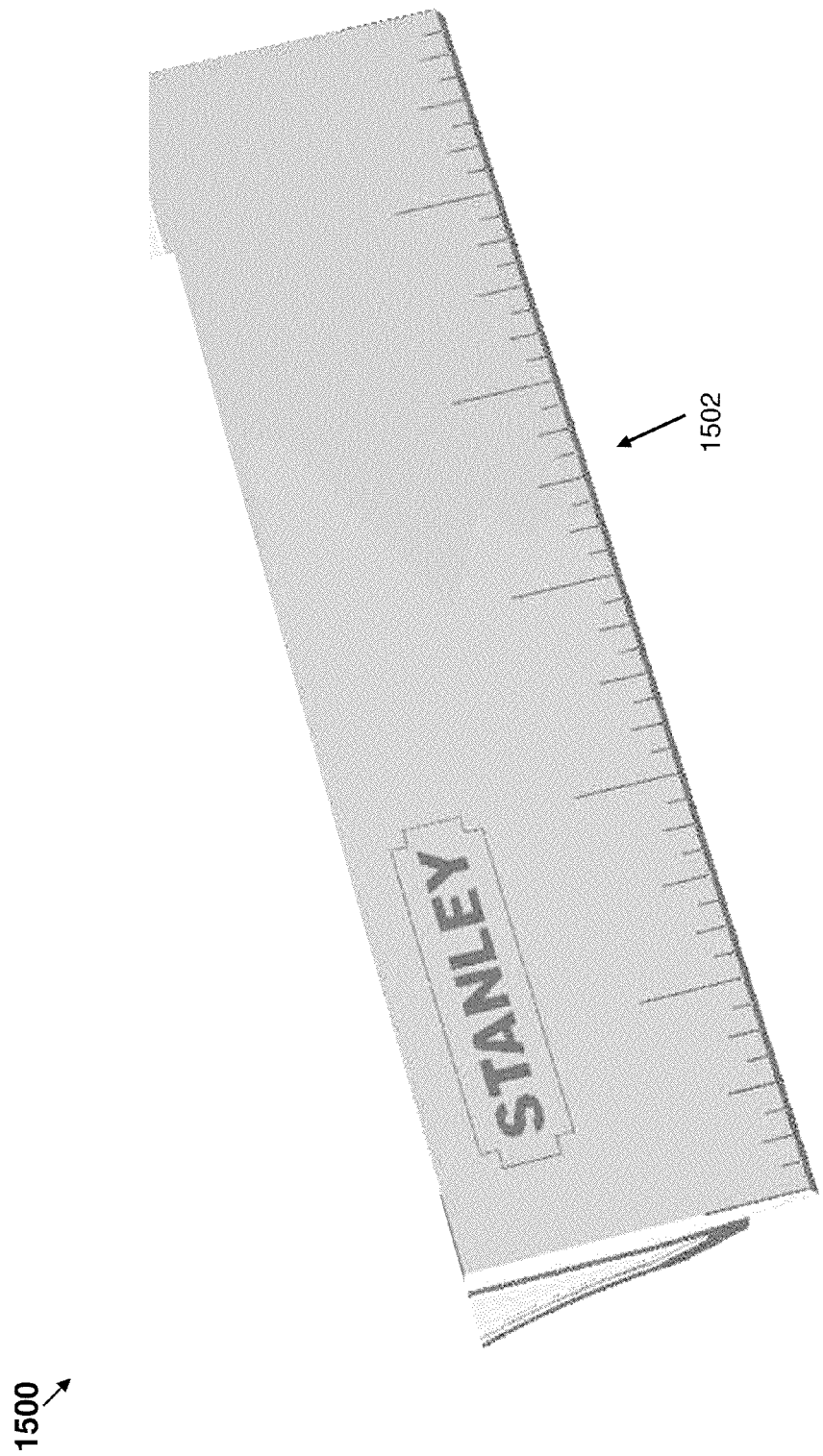
FIG. 15 depicts a front view of the rolling ruler having a blade member with a measuring edge.

In an embodiment, the blade member 904 of the rolling ruler 902 may include a measuring edge. Referring to FIG. 15, a front view 1500 of the rolling ruler 902 having the blade member 904 with a measuring edge 1502 is depicted. In an embodiment, the measuring edge 1502 may be a flat lateral edge. In another embodiment, the measuring edge 1502 may include a relief on the side opposite the side with the measurement markings that may form a ridge. The ridge may enable the user to securely capture an end of a wooden plank for accurate end-in measurement. For example, the user may engage the ridge of the measuring edge 1502 with an end portion of the wooden plank. The end portion may be a starting point for taking a measurement. The user may thereafter, set the readings of the rolling ruler 902 to zero before taking new measurements.

As described herein above, the rolling ruler 902 may include a microcontroller. The microcontroller may control the supply of power to the rolling ruler 902. For example, if the rolling ruler 902 has been lying unused for some time, the microcontroller may automatically switch off the power supply to the rolling ruler 902. In an embodiment, the user may set a time interval as an idle time after which the microcontroller may switch off the power supply. Further, the rolling of the roller may signal to the microcontroller to automatically turn on other electronic components of the rolling ruler 902. For example, the rolling of the roller of the rolling ruler 902 may automatically measure distance, and may also display the measurements on the display panel 1402.

Figure 16:
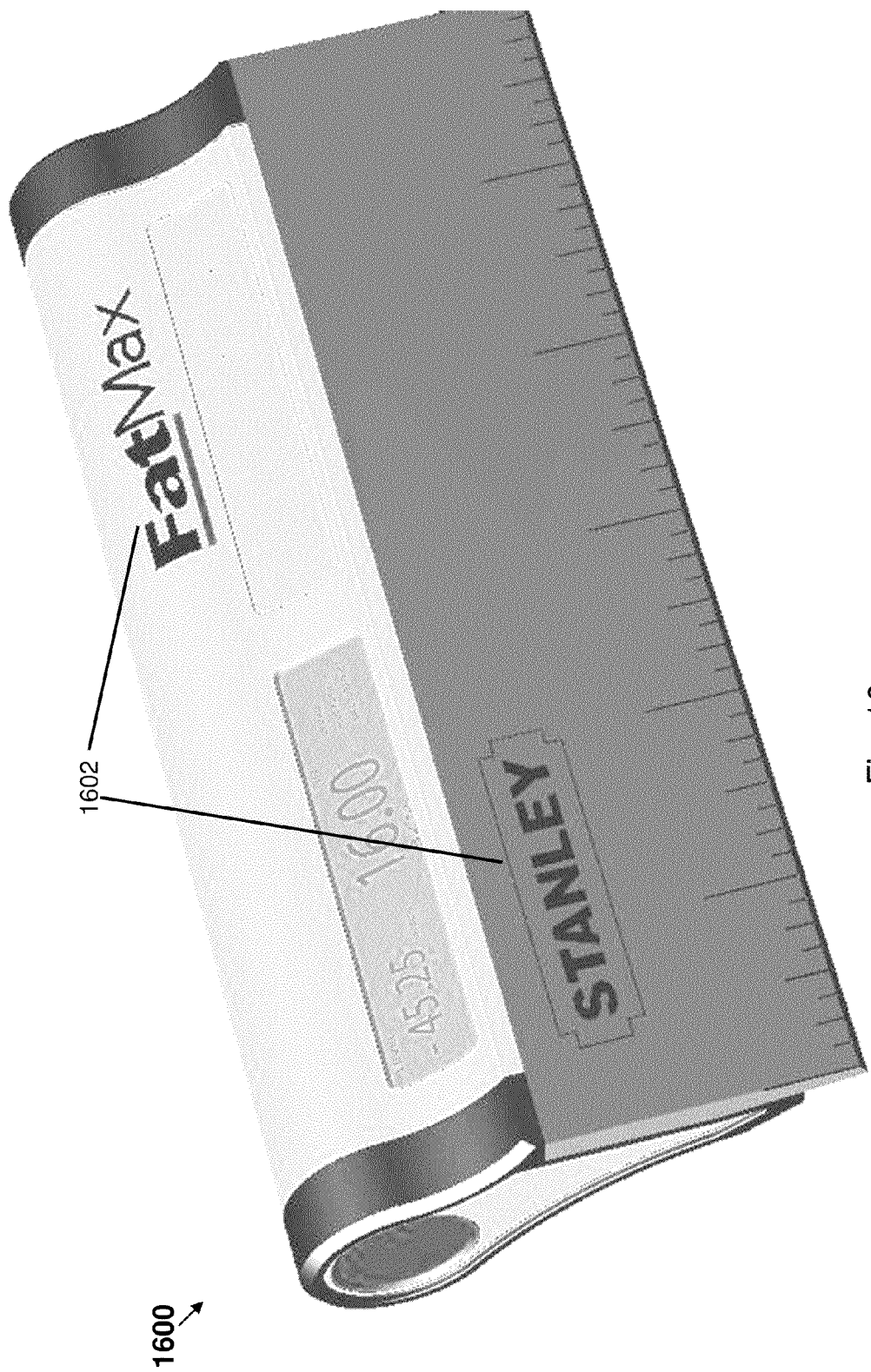
FIG. 16 depicts a plan view of the rolling ruler including a brand.

In embodiments, the rolling ruler 902 may also provide private label branding opportunities for a supplier of the rolling ruler 902. Referring to FIG. 16, a front perspective view 1600 of the rolling ruler 902 including a brand 1602 is depicted. In embodiments, the brand 1602 may be a company logo, a trade name, a trademark, an image, or some other type of branding. The brand 1602 may be placed on the rolling ruler 902 by a process, including, but not limited etching, burning, printing, pressing, scratching, painting or some other process. Further, the brand 1602 may be disposed on any locations such as the blade member 904 and the handle 908. The brand 1602 may be in different colors as per the supplier. In an example, the light source may generate a certain color to coordinate with the private label brand color. Further, the brand 1602 may be displayed on the display panel 1402 as a logo.

In addition, the rolling ruler 902 may include an adjustable mount, such as an elongated recess (not shown) for holding markers such as a pen, pencil, and the like.

While the invention has been disclosed in connection with the preferred embodiments shown and described in detail, various modifications and improvements thereon will become readily apparent to those skilled in the art. Accordingly, the spirit and scope of the present invention is not to be limited by the foregoing examples, but is to be understood in the broadest sense allowable by law.

All documents referenced herein are hereby incorporated by reference.

What is claimed is:

1. A rolling ruler comprising:
   a blade member configured to facilitate taking a measurement;
   a digital level;
   a handle coupled to the blade member and configured to be gripped by a user, wherein the handle acts as a housing for storing a plurality of electronic components, the plurality of electronic components providing predefined functionalities to the rolling ruler;
   at least one roller disposed within the handle, the at least one roller with a rolling surface that is partially exposed through a backside of the handle for contacting a surface to be measured, the at least one roller in operable contact with a portion of the plurality of electronic components to facilitate measuring distance based on rotations of the at least one roller; and
   a display disposed between the handle and the blade member for simultaneously displaying angular orientation determined by the digital level and distance traveled based on rotations of the at least one roller.

2. The ruler of claim 1, wherein the blade member includes dimension markings thereon.

3. The ruler of claim 2, wherein the markings define at least one of millimeters, centimeters, and inches.

4. The ruler of claim 1, wherein the blade member is composed of a material selected from steel, plastic, and wood.

5. The ruler of claim 1, wherein the at least one roller is disposed longitudinally relative to the handle.

6. The ruler of claim 1, wherein the at least one roller is rotatably supported by ball bearings.

7. The ruler of claim 1, wherein the handle has a rounded shape.

8. The ruler of claim 1, wherein one of the plurality of electronic components includes a battery for providing power to the at least one other of the plurality of electronic components.

9. The ruler of claim 1, wherein one of the plurality of electronic components includes a digital measurement and display system configured to provide digital measurement options.

10. The ruler of claim 9, wherein the digital measurement options include digital level alert settings.

11. The ruler of claim 10, wherein the alert settings are controlled by a microcontroller disposed in the housing.

12. The ruler of claim 9, wherein the digital measurement options include transmission of data.

13. The ruler of claim 1, further comprising a plurality of keys disposed substantially in line with the display, the keys for facilitating a user to interact with a portion of the plurality of electronic components to configure digital level settings, configure measuring units and interval measurement settings, capture and save measured distance and angular orientation of the digital level, and configure the ruler to provide an alert indication based on an angular orientation of the ruler.

14. The ruler of claim 1, further comprising a relief formed into the underside of the blade member that facilitates material end-in measurement.

15. The ruler of claim 1, wherein the at least one roller comprises three in-line rollers.

16. The ruler of claim 1, wherein the predefined functionalities comprise capturing and displaying a first distance traveled, a second distance traveled that is contiguous to an end position of the first distance traveled, and a total distance traveled that comprises the first distance traveled and the second distance traveled.

17. The ruler of claim 1, wherein the handle comprises soft grip material and encapsulated gel.

* * * * *